Jan. 1, 1929.
E. R. HIATT
DETACHABLE HANDLE
Filed March 8, 1926
1,697,241
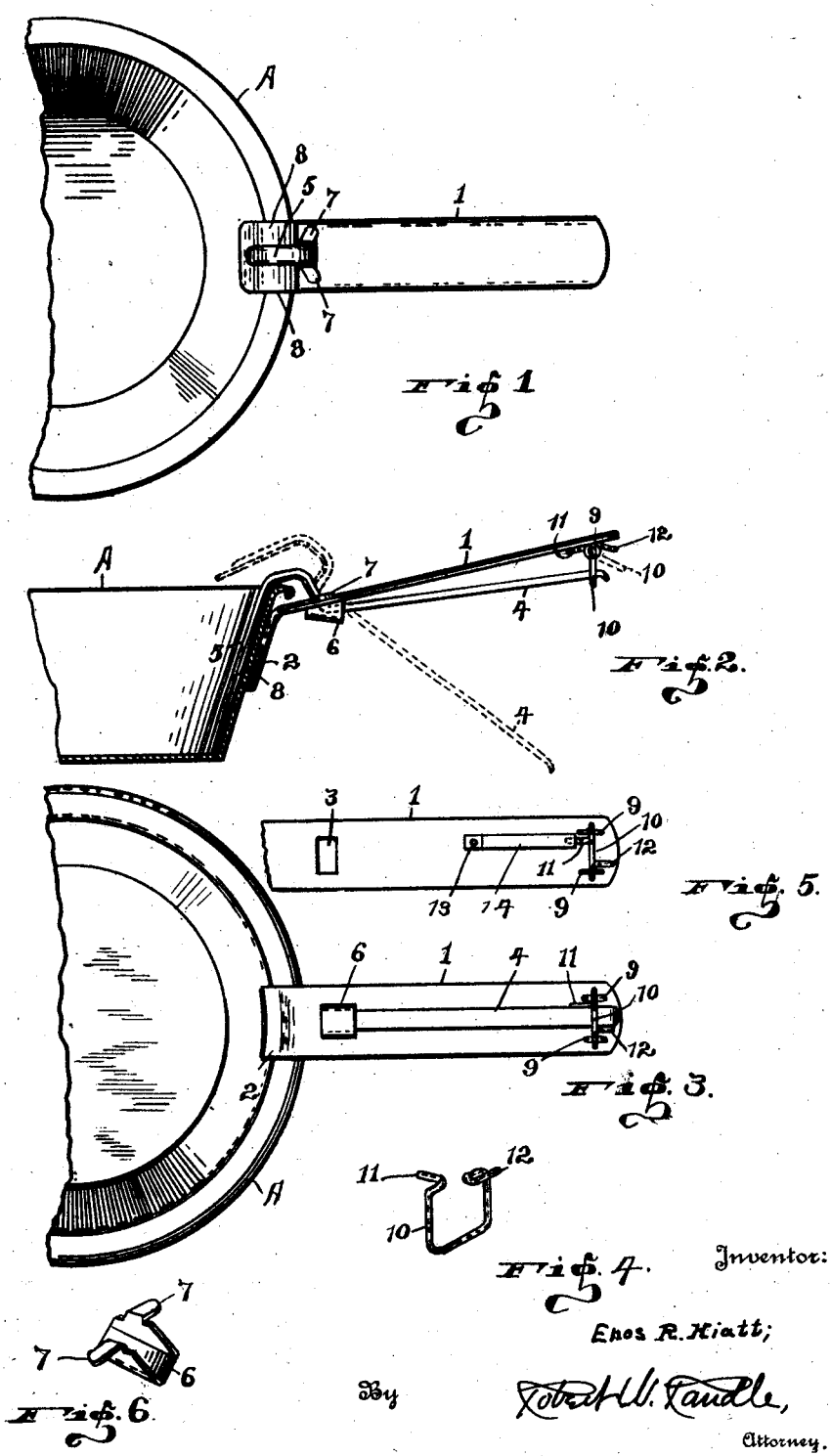

Patented Jan. 1, 1929.

1,697,241

UNITED STATES PATENT OFFICE.

ENOS R. HIATT, OF WINCHESTER, INDIANA.

DETACHABLE HANDLE.

Application filed March 8, 1926. Serial No. 93,127.

The object of my present invention, broadly speaking, is to provide a detachable handle which is simple in construction, easily operated in attaching and detaching, efficient in operation, and which can be manufactured and sold at a comparatively low price. More specifically stated, the object of my invention is to provide a handle by means of which a pan or other vessel or device can be grasped and carried as safely as with a fixed handle, and then when not required it can be easily and instantly detached, whereby it will not be in one's way when using such vessels. Further objects are to provide a detachable handle by which a pan or other vessel may be grasped and released as easily and quickly as with one's hand, whereby the pan or vessel may be heated without heating the handle, thereby dispensing with the use of a cloth or the like for lifting the heated pan or vessel, and thereby saving space in an oven or on a stove, as there will be no handle to interfere or be in the way.

I have shown my detachable handle in connection with a pan, and will describe it as for culinary purposes, but it is to be understood that it is not to be limited thereto, but it may be employed for a variety of purposes.

The preferred means for carrying out the principles of my invention in a practical, efficient, and mechanically perfect manner is shown in the accompanying drawings, in which—Figure 1 is a top plan view of my device attached to a pan. Figure 2 is a side elevation of the device attached to a pan, showing the pan in cross section, and in dotted lines showing the device open and released from the pan. Figure 3 is a bottom plan view of the device attached to a pan. Figure 4 is a detail perspective view of the catch alone.

Figure 5 shows the underside of the main handle portion, with the lever omitted, showing the aperture formed in the main portion of the handle through which the lever operates, and showing the addition of a spring for controlling the catch. And Figure 6 is a perspective view of the clasp alone.

Similar indices denote like parts throughout the several views.

In order that the construction, the operation, and the several advantages of my invention may be more fully understood and appreciated I will now take up a detailed description thereof, in which I will set forth the same as comprehensively as I may.

Referring now to the drawings in detail: Letter A denotes a portion of an ordinary pan, or other utensil, with which my invention is adapted to be used.

The device proper comprises the body member 1, which forms the handle proper, and integral therewith and forming a part thereof is the jaw portion 2, which is simply a continuation of the member 1, but is turned at an obtuse angle with relation thereto. The members 1 and 2 are formed of a single length of rather heavy flat metal substantially as indicated. Formed through the member 1, and located a short distance from the member 2, is a substantially square aperture 3, for the purpose hereinafter stated. Numeral 4 denotes a lever, and integral therewith and being a continuation thereof is the substantially U-shaped hook member 5. At the juncture of the members 4 and 5 they are turned at substantially right-angles to each other. The member 4 is adapted to be inserted through the aperture 3, with the juncture of the members 4 and 5 located in said aperture where it is retained in hinged relation as follows: Numeral 6 denotes the body of the clasp, which is located on the underside of the member 1, with the inner portion of member 4 fitting between the sides thereof. The sides of the clamp terminate in the two prongs 7, which prongs extend through the aperture 3 on each side of the lever 4, and after the lever 4 is in operative position as shown then said prongs are bent outward and apart into contact with the upper side of the member 1, thereby securing the lever in the aperture 3, but permitting it to have a limited movement, as indicated by the dotted lines in which it is shown in Fig. 2, but without permitting endwise movement thereof.

Secured to the inner or concave face of the member 5 and corresponding in curvature therewith is the clamping jaw member 8, which is of the same width as the member 1, and it extends at substantially the same angle with relation to the lever 4 as does the member 2 with relation to the member 1. The clamp member 8 extends from near the aperture 3 to and beyond the end of the member 5.

In practice the member 2 is adapted to contact flat with the angular side of the pan A, while the member 8 is adapted to fit over the rim of the pan and extend downward in contact with the inner face of the angular side thereof, as shown in Fig. 2, in which condition the members 1 and 4 will project outward and upward at an angle.

Secured to the under face and near the outer end of the member 1 are two, spaced apart, eyelets 9, which are arranged crosswise of the member 1. Numeral 10 denotes a catch formed of spring wire or the like, bent to substantially square shape as shown in Fig. 4. Near the ends of the catch 10 are inturned portions which extend through the eyes of the eyelets 9 whereby the catch 10 is hinged.

Extending inward from one end of the catch 10 is a finger 11, and extending outward from the other end of the member 10 is a finger 12. Said fingers 11 and 12 being simply continuations of the same material of which the member 10 is formed. Said fingers 11 and 12 extend at right-angles to the main portion of the catch 10, the finger 11 extends directly forward while the finger 12 extends rearward and slightly downward, that is at an angle with relation to the finger 11, whereby the catch 10 may have only a limited movement from its right angular position with relation to the member 1. That is to say, it can not be turned forward beyond right angles with relation to the member 1 by reason of the finger 11, but it can be turned rearward at an angle, that is until the finger 12 engages the member 1.

The rear end of the member 4 is slightly curved and terminates in an edge, as shown in Fig. 2, and this rear or outer end of the member 4 is adapted to enter the space formed by the shape of the catch 10.

Numeral 14 denotes a flat spring which is secured to the under side of the member 1 by the rivet 13, as shown in Fig. 5. The free end of said spring rests on the finger 11 and normally retains said finger pressed against the member 1 and thereby retaining the catch 10 in right-angular position, and causing it to return to that position after it has been pressed rearward.

In operation one has only to grasp the member 1, allowing the lever 4 to drop down to its limit, thereby spacing the jaws 2 and 8 with relation to each other. The device is then brought to position over the edge of the pan A. Then by one's fingers, of the hand holding the member 1, the lever 4 is drawn toward the member 1 until the end of the lever engages with the catch 10, which latter will automatically spring back and engage the end of the lever 4, thereby causing the jaws 2 and 8 to engage the opposite sides of the pan, thereby securing the device in operative position. The handle is made more secure for the reason that, as will be noticed, the jaws 2 and 8 will engage the pan before the lever 4 reaches its secured position with relation to member 1, thereby further pressing by one's fingers against the resiliency of the members to bring the lever to its locked position will cause considerable tension of the members 2 and 8 upon the pan, therefore with the lever finally in its locked position all slack will be taken up and the jaws will be rigidly clamped upon the pan.

In order to release the device one has only to grasp the member 1 and the lever 4, springing them slightly toward each other, and with the little finger of the same hand the catch 10 is turned slightly rearward thereby releasing the lever 4 and permitting it to drop down to its limit of movement, which will cause the jaw 2 and the jaw 8 to spread apart and release the pan and permit the device to be lifted from contact with the pan.

Either the placing of the device in connection with the pan, or the releasing of it therefrom can be done almost instantly, or as quickly as one could grasp the pan or release by one's hand.

I desire that it be understood that various changes may be made in the several details herein set forth without departing from the spirit of the invention and without sacrificing any of the advantages thereof which are new and useful.

Having now fully shown and described my invention, what I claim and desire to secure by Letters Patent of the United States, is—

A detachable handle consisting of a handle portion and a jaw portion integral therewith and extending at an angle from the forward end thereof, there being an aperture formed through the handle portion and located a short distance from the jaw portion, a lever extending loosely into said aperture, a hook member formed integral with the forward end of said lever, a clamp hinging said lever in said aperture and retained in place by prongs which are bent outward on the side of the handle portion opposite to the side on which the lever is located and having a body portion extending over said lever but without direct connection therewith, a clamping jaw secured to the inner face of said hook member and corresponding with the curvature thereof with its forward portion corresponding with the angle of the jaw of the handle portion, a catch for detachably securing the rear end of said lever to said handle, and a spring for normally retaining said catch at right-angles to the handle portion.

In testimony whereof I have hereunto subscribed my name.

ENOS R. HIATT.